(12) United States Patent
Slaton

(10) Patent No.: US 8,286,009 B2
(45) Date of Patent: Oct. 9, 2012

(54) COMPUTER INCLUDING A CARRIER BOARD AND METHODS OF ASSEMBLY

(75) Inventor: David S. Slaton, Huntsville, AL (US)

(73) Assignee: GE Intelligent Platforms Embedded Systems, Inc., Charlottesville, VA (US)

( * ) Notice: Subject to any disclaimer, the term of this patent is extended or adjusted under 35 U.S.C. 154(b) by 509 days.

(21) Appl. No.: 12/551,116

(22) Filed: Aug. 31, 2009

(65) Prior Publication Data

US 2011/0055595 A1    Mar. 3, 2011

(51) Int. Cl.
*G06F 1/00* (2006.01)
(52) U.S. Cl. ......................... 713/300; 710/302
(58) Field of Classification Search .......... 710/301–306; 713/300–340
See application file for complete search history.

(56) References Cited

U.S. PATENT DOCUMENTS

| | | |
|---|---|---|
| 6,935,868 B1 | 8/2005 | Campini et al. |
| 7,266,627 B2 * | 9/2007 | DeNies et al. ............... 710/301 |
| 7,414,837 B2 | 8/2008 | Su |
| 7,502,882 B2 | 3/2009 | Stahl et al. |
| 2006/0221590 A1 | 10/2006 | Campini et al. |
| 2007/0124529 A1 | 5/2007 | Carr et al. |
| 2008/0037218 A1 | 2/2008 | Sharma et al. |
| 2008/0201515 A1 | 8/2008 | Birgin et al. |

FOREIGN PATENT DOCUMENTS

| | | |
|---|---|---|
| EP | 2009819 A1 | 12/2008 |
| EP | 2031884 A1 | 3/2009 |
| EP | 2207304 A1 | 7/2010 |
| WO | 2006071625 A1 | 7/2006 |
| WO | 2009056020 A1 | 5/2009 |

OTHER PUBLICATIONS

Stuart Jamieson., "Micro Telecommunication Computing Architecture Short Form Specification", Sep. 21, 2006.
PCI Industrial Computer Manufactures Group., "Picmg AMC. O Advanced Mezzanine Internet Citation", Jun. 15, 2004. URL:http://www.picmg.org/pdf/AMC_DO.9_short_spec.pdf.
EP10173624, European Search Report and Written Opinion, Nov. 22, 2010.

* cited by examiner

*Primary Examiner* — Brian Misiura
*Assistant Examiner* — Kim Huynh
(74) *Attorney, Agent, or Firm* — GE Global Patent Operation; Catherine J. Toppin

(57) ABSTRACT

A method is provided for assembling a computer that includes a carrier board having a board management controller (BMC), a power supply, and a carrier bus. The method includes coupling a module to the carrier board, determining, by the carrier board, a type of the module, and providing power to the module based on the module type such that a voltage component of the power is one of a first voltage and a second voltage that is different than the first voltage.

18 Claims, 4 Drawing Sheets

COMPUTER INCLUDING A CARRIER BOARD AND METHODS OF ASSEMBLY

BACKGROUND

The embodiments described herein relate generally to computers and, more particularly, to computer carrier boards that provide power and management functions to standard computer modules and low-cost computer modules.

At least some known computers include multiple hard drives that are mounted to standard advanced mezzanine card (AMC) modules that provide individualized management functions and voltage converters. Moreover, at least some known modules also include on-board interface controllers for interfacing with the hard drives. Such modules interface with a carrier board that includes a controller for communicating with the management controllers of each module. Specifically, the carrier board controller communicates with each management controller to determine whether to enable each module.

Moreover, at least some known computers include a carrier board having an AMC adapter for use with non-AMC modules. The adapter includes a bridge that converts between non-AMC and AMC communication protocols. Moreover, the AMC adapter includes a legacy card connector that facilitates coupling the non-AMC module to an AMC connector within the carrier board.

BRIEF DESCRIPTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method is provided for assembling a computer that includes a carrier board having a board management controller (BMC), a power supply, and a carrier bus. The method includes coupling a module to the carrier board, determining, by the carrier board, a type of the module, and providing power to the module based on the module type such that a voltage component of the power is one of a first voltage and a second voltage that is different than the first voltage.

In another aspect, a computer is provided and includes at least one module and a carrier board. The module includes a module component, and the carrier board includes a carrier bus, a board management controller (BMC), and a power supply. The BMC is configured to detect a module type of the module. The power supply is coupled to the BMC, and is configured to provide a supply voltage to the module based on the module type, wherein the supply voltage is one of a first voltage and a second voltage different than the first voltage.

In another aspect, a carrier board is provided for use with a computer that includes at least one module having a module component. The carrier board includes a controller configured to determine a module type of the module, and a power supply configured to provide one of a first voltage and a second voltage to the module based on the module type, wherein the first voltage is different than the second voltage. The carrier board also includes a carrier bus configured to communicate with the module component of the module.

BRIEF DESCRIPTION OF THE DRAWINGS

The embodiments described herein may be better understood by referring to the following description in conjunction with the accompanying drawings.

DETAILED DESCRIPTION

Figure 1:
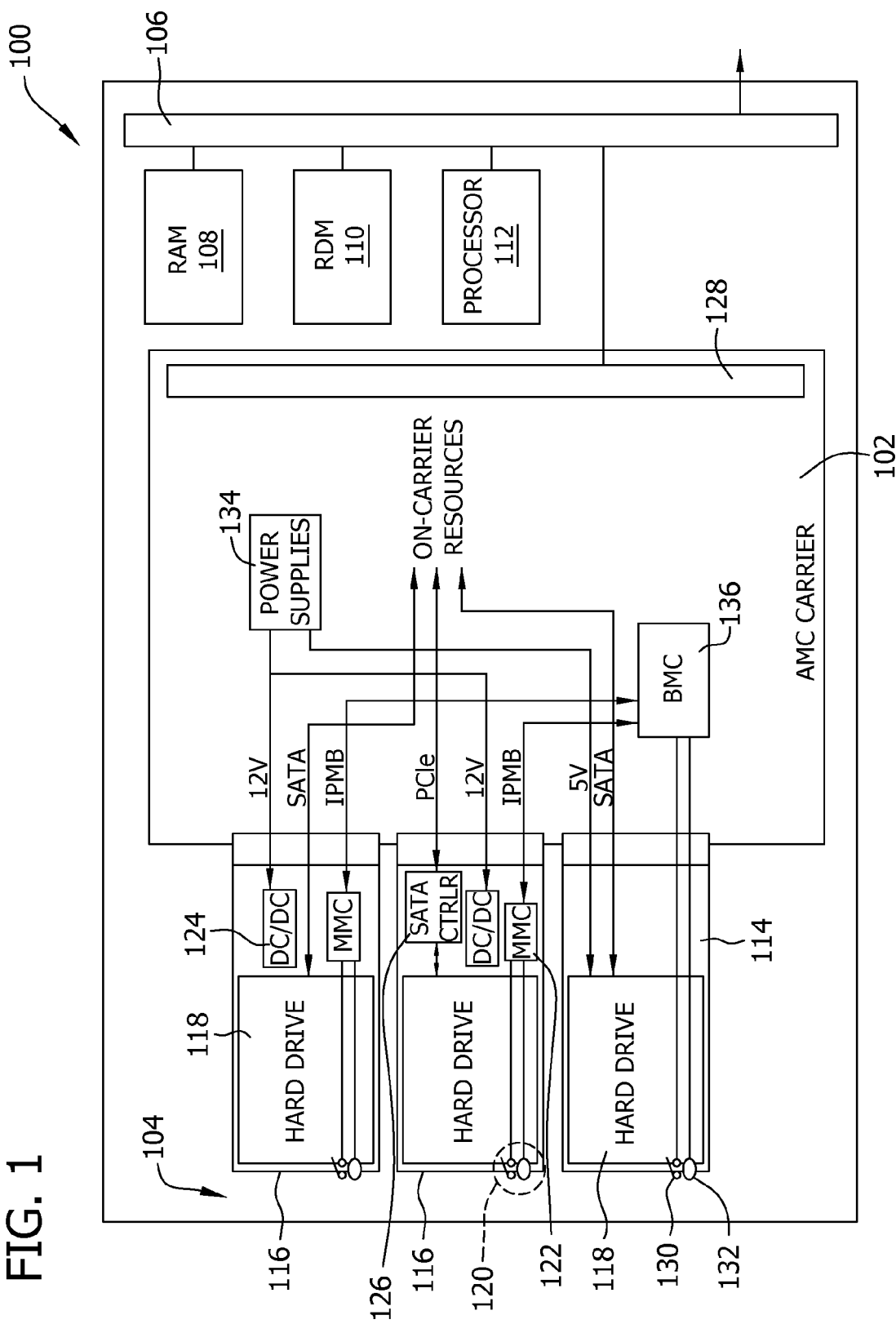
FIG. 1 is a schematic diagram illustrating an exemplary computer that includes at least one carrier board and a plurality of modules.

In some embodiments, the term "carrier board" refers generally to an Advanced Telecommunications Computing Architecture (AdvancedTCA®) carrier board (AdvancedTCA® is a registered trademark of PICMG-PCI Industrial Computer Manufacturers Group. Inc. of Wakefield, Mass., USA). Accordingly, in at least some embodiments, the term "carrier board" may refer generally to any computer component that is adapted for use with rear transition modules that plug into respective slot locations along a rear shelf, such as an advanced mezzanine card (AMC) or a low-cost AMC.

A computing device or computer such as described herein has one or more processors or processing units and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media. Moreover, in some embodiments, the term "computer" refers generally to any computer adapted for use with carrier boards as defined hereinabove. For example, the term "carrier board" may also be used to refer to a MicroTCA® chassis (MicroTCA® is a registered trademark of PICMG-PCI Industrial Computer Manufacturers Group, Inc. of Wakefield, Mass., USA).

Although described in connection with an exemplary computing system environment, embodiments are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the invention.

In some embodiments, a processor and/or a logic module includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

Described in detail herein are exemplary embodiments of methods, computers, and carrier boards that facilitate enabling use of lower cost component modules while maintaining existing functionality provided by existing component modules and, more particularly, constitute exemplary means for detecting a module type upon insertion of a module into a carrier board within a computer. Automatically detecting a module type using such a system facilitates lowering a total cost of ownership including initial purchase and replacement costs. Moreover, the embodiments described herein facilitate providing increased scalability, portability, and ease of redeployment from one site to another. Further, providing services via a carrier board rather than via each module facilitates reducing the complexity of circuitry of each module, which, in turn, facilitates reducing a number of board layers for each module and/or fabricating board layers with less expensive materials. Reducing the number of board layers and/or using less expensive materials for fabrication facilitates decreasing production costs of such modules.

Technical effects of the methods, computers, and carrier boards described herein include at least one of: (a) coupling one or more modules to a carrier board, wherein the modules may be low-cost modules, standard AMC modules, or a combination of both low-cost modules and standard AMC modules; (b) determining a type of each module coupled to the carrier board based on a logic reading at a detection pin located on the module board; (c) providing power to each module based on the module type, wherein low-cost modules are provided with power at a first voltage directly from a carrier board power supply, and standard AMC modules are provided with power at a second voltage via a voltage converter located on the standard AMC module board; (d) directly monitoring hot-swap electronics of low-cost modules, including a hot-swap light device and a hot-swap switch, via a Board Management Controller located on the carrier board; and (e) interfacing a module component of each module to a carrier bus.

The methods, computers, and carrier boards described herein are not limited to the specific embodiments described herein. For example, components of each computer and/or steps of each method may be used and/or practiced independently and separately from other components and/or steps described herein. In addition, each component and/or step may also be used and/or practiced with other assembly packages and methods.

FIG. 1 is a schematic diagram illustrating an exemplary computer 100 that includes at least one carrier board 102 and a plurality of modules 104. More specifically, modules 104 are inserted into carrier board 102, and carrier board 102 is then inserted into computer 100. In the exemplary embodiment, computer 100 includes a computer bus 106 that facilitates data communication between modules 104 and one or more additional computers 100 coupled via a network (not shown) such as an intranet or the Internet. Moreover, computer 100 includes at least one random access memory (RAM) module 108, at least one read-only memory (ROM) module 110, and/or at least one processor 112. Each of RAM module 108, ROM module 110, and/or processor 112 is coupled to computer bus 106.

In the exemplary embodiment, modules 104 may be first modules, such as a low-cost modules 114, second modules, such as standard modules 116, or a mixture of low-cost modules 114 and standard modules 116. Each low-cost module 114 and standard module 116 includes a module component 118. Module components 118 may be hard drives, network interfaces, processors, and/or any other suitable computer component that is usable with removable modules. In the exemplary embodiment, each low-cost module 114 includes module component 118 and a hot-swap circuit 120. Moreover, in the exemplary embodiment, each standard module 116 includes module management controller (MMC) 122, a voltage converter 124, and hot-swap circuit 120. In some embodiments, standard module 116 also includes a communication controller 126 that couples module component 118 to a carrier bus 128. Each hot-swap circuit 120 includes a hot-swap switch 130 and a hot-swap light device 132, such as a light emitting diode (LED).

In the exemplary embodiment, carrier board 102 includes carrier bus 128, one or more power supplies 134, and a baseboard management controller (BMC) 136. In the exemplary embodiment, carrier board 102 includes more than one power supply 134, wherein each power supply 134 provides power to modules 104 using a different voltage. For example, carrier board 102 includes two power supplies, referred to generically as power supply 134 in FIG. 1. A first power supply 134 provides power to low-cost module 114 at a first voltage level, such as approximately 5 Volts (V). A second power supply 134 provides power to standard module 116 at a second voltage level, such as approximately 12 V. In an alternative embodiment, carrier board 102 includes a single power supply 134 that provides power to modules 104 using multiple voltage levels. For example, power supply 134 provides power to low-cost module 114 at a first voltage level, and provides power to standard module 116 at a second voltage level that is different than the first voltage level.

In the exemplary embodiment, carrier bus 128 supports communication between modules 104 and other on-carrier resources and/or computer components, such as computer bus 106. More specifically, carrier bus 128 is coupled directly to module component 118 of low-cost module 114, and facilitates communication between module component 118 and other on-carrier resources and/or computer components using a specific communication protocol. Carrier bus 128 is also coupled to module component 118 of standard module 116, and facilitates communication between module component 118 and other on-carrier resources and/or computer components using a specific communication protocol. Alternatively, carrier bus 128 may be coupled to communication controller 126 of standard module 116 to facilitate communication between module component 118 and other on-carrier resources and/or computer components via communication controller 126 using a specific communication protocol. The communication protocols used for communication between carrier bus 128 and module component 118 or communication controller 126 may be dependent on, for example, the type of module component 118 used. For example, hard drive module components may communicate using protocols such as Serial Advanced Technology Attachment (SATA) protocol, Peripheral Component Interconnect Express (PCIe®) protocol, or any other suitable communication protocol. (PCIe® is a registered trademark of PCI-SIG Corporation of Portland, Oreg., USA.) Other module component types may similarly use any suitable communication protocol to facilitate communication between carrier bus 128 and communication controller 126 or module component 118.

In the exemplary embodiment, BMC 136 is coupled to power supplies 134 and carrier bus 128. Moreover, BMC 136 is directly coupled to hot-swap circuit 120 of low-cost module 114, and is coupled to MMC 122 of standard module 116. BMC 136 communicates with MMC 122 using a communication protocol such as the Intelligent Platform Management Bus (IPMB) protocol or any other suitable communication protocol.

Figure 2:
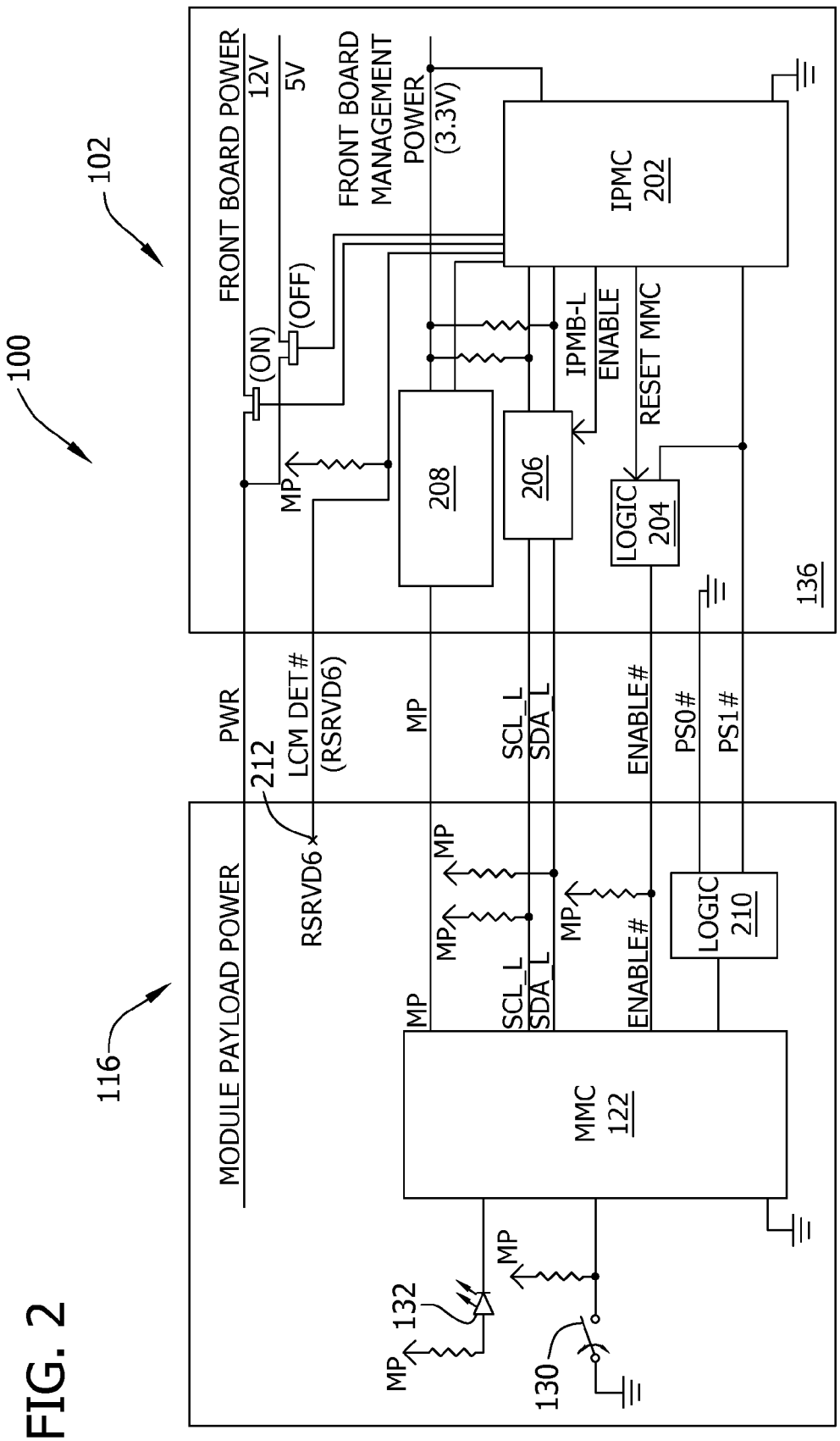
FIG. 2 is a schematic circuit diagram that illustrates pin connections between a standard module and a carrier board within the computer shown in FIG. 1.
Figure 3:
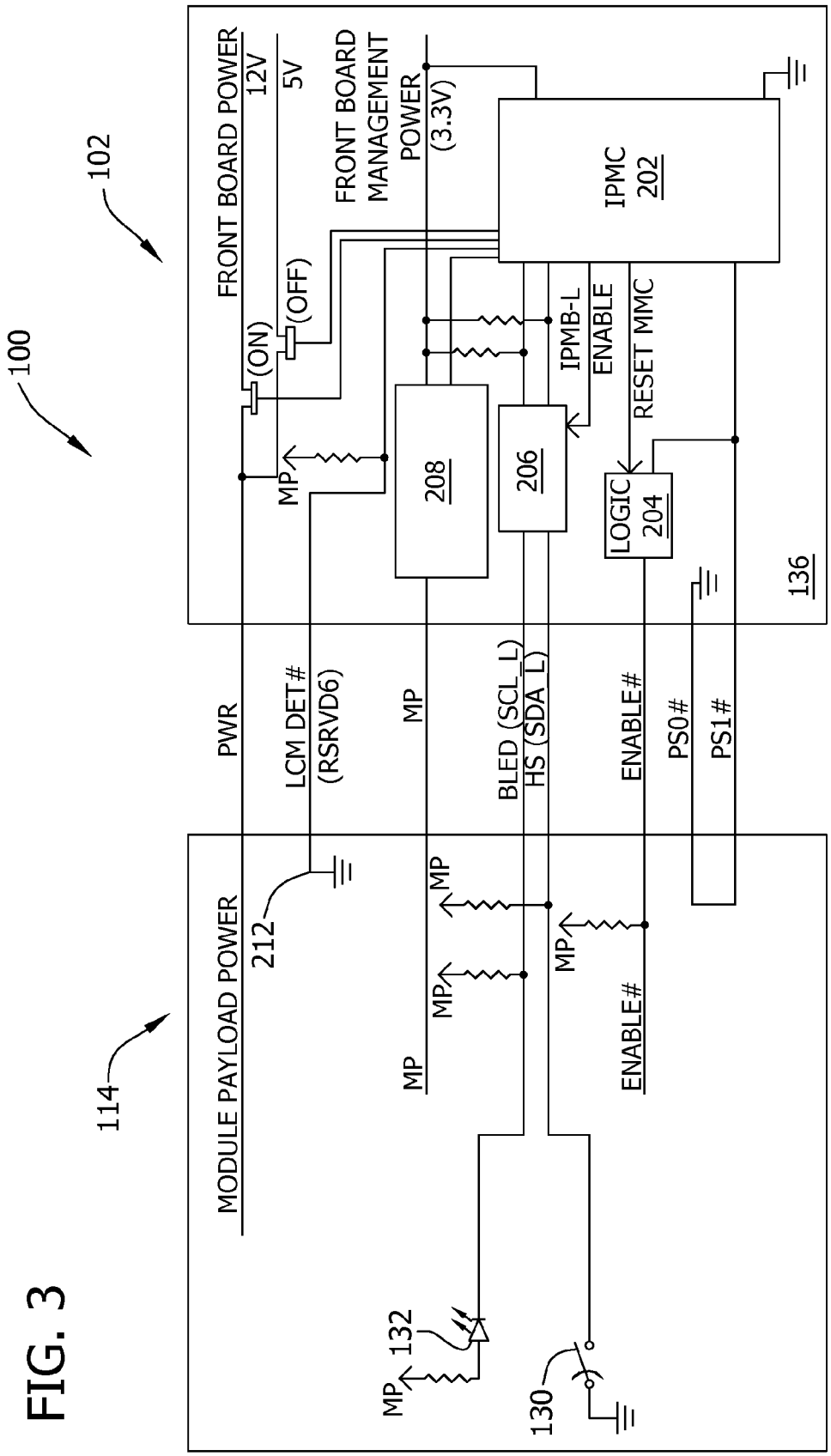
FIG. 3 is a schematic circuit diagram that illustrates pin connections between a low-cost module and a carrier board within the computer shown in FIG. 1.

FIG. 2 is a schematic circuit diagram that illustrates pin connections between standard module 116 and carrier board 102. More specifically, as shown in FIG. 2, computer 100 includes pin connections between standard module 116 and both BMC 136 and power supplies 134 (not shown in FIG. 2) of carrier board 102. FIG. 3 is a schematic circuit diagram that illustrates pin connections between low-cost module 114 and carrier board 102. More specifically, as shown in FIG. 3, computer 100 includes pin connections between low-cost module 114 and both BMC 136 and power supplies 134 (not shown in FIG. 3) of carrier board 102.

In the exemplary embodiment, and referring to FIGS. 2 and 3, BMC 136 includes an Intelligent Platform Management Controller (IPMC) 202, a logic module 204, an IPMB Local (IPMB-L) isolator 206, and one or more power monitoring circuits 208. Within BMC 136, IPMC 202 is coupled to logic module 204 and power monitoring circuits 208. BMC 136 is also coupled to a carrier board power supply (not shown), and to power supplies 134.

Referring to FIG. 2, standard module 116 includes MMC 122, hot-swap switch 130, hot-swap light device 132, and a logic module 210. In the exemplary embodiment, a detection pin 212 is left open, or unconnected, on standard module 116. IPMC 202 is coupled to the carrier board power supply such that, when standard module 116 is inserted into carrier board 102, IPMC 202 detects a logic high, which indicates the presence of standard module 116. As such, power supplies 134 provide power to voltage converter 124 (shown in FIG. 1) at a second voltage level, such as approximately 12 Volts. Moreover, IPMB-L isolator 206 is coupled to MMC 122 via two pins, SCL_L and SDA_L to facilitate communication between BMC 136 and MMC 122 using the IPMC protocol.

Referring now to FIG. 3, low-cost module 114 includes hot-swap switch 130 and hot-swap light device 132. In the exemplary embodiment, detection pin 212 is tied to ground such that, when low-cost module 114 is inserted into carrier board 102, IPMC 202 detects a logic low, which indicates the presence of low-cost module 114. As such, BMC 136 communicates directly with hot-swap switch 130 and hot-swap light device 132. More specifically, IPMB-L isolator 206 is coupled directly to hot-swap switch 130 via an SDA_L pin to facilitate detecting when hot-swap switch is triggered. IPMB-L isolator 206 is also coupled directly to hot-swap light device 132 via an SCL_L pin to facilitate operating hot-swap light device 132. Moreover, power supplies 134 provide power to low-cost module 114 at a first voltage level, such as approximately 5 Volts.

During operation, and referring to FIGS. 1-3, when a module is inserted into carrier board 102, BMC 136 detects whether the module is low-cost module 114 or standard module 116 based on whether IPMC 202 detects a logic low or a logic high at detection pin 212 on the module. When IPMC 202 detects a logic high, IPMC 202 determines that standard module 116 has been inserted. Accordingly, IPMC 202 controls power supplies 134 to provide power to voltage converter 124 at a second voltage level. Moreover, IPMC 202 utilizes the SCL_L and SDA_L pins as the IPMC management bus to facilitate communication between MMC 122 and IPMC 202.

Conversely, when IPMC 202 detects a logic low at detection pin 212, IPMC 202 determines that low-cost module 114 has been inserted. Accordingly. IPMC 202 controls power supplies 134 to provide power directly to module component 118 at a first voltage level. In the exemplary embodiment, the first voltage level is lower than the second voltage level. Moreover, IPMC 202 utilizes the SCL_L pin to control and monitor hot-swap light device 132, and utilizes the SDA_L pin to control and monitor hot-swap switch 130.

Figure 4:
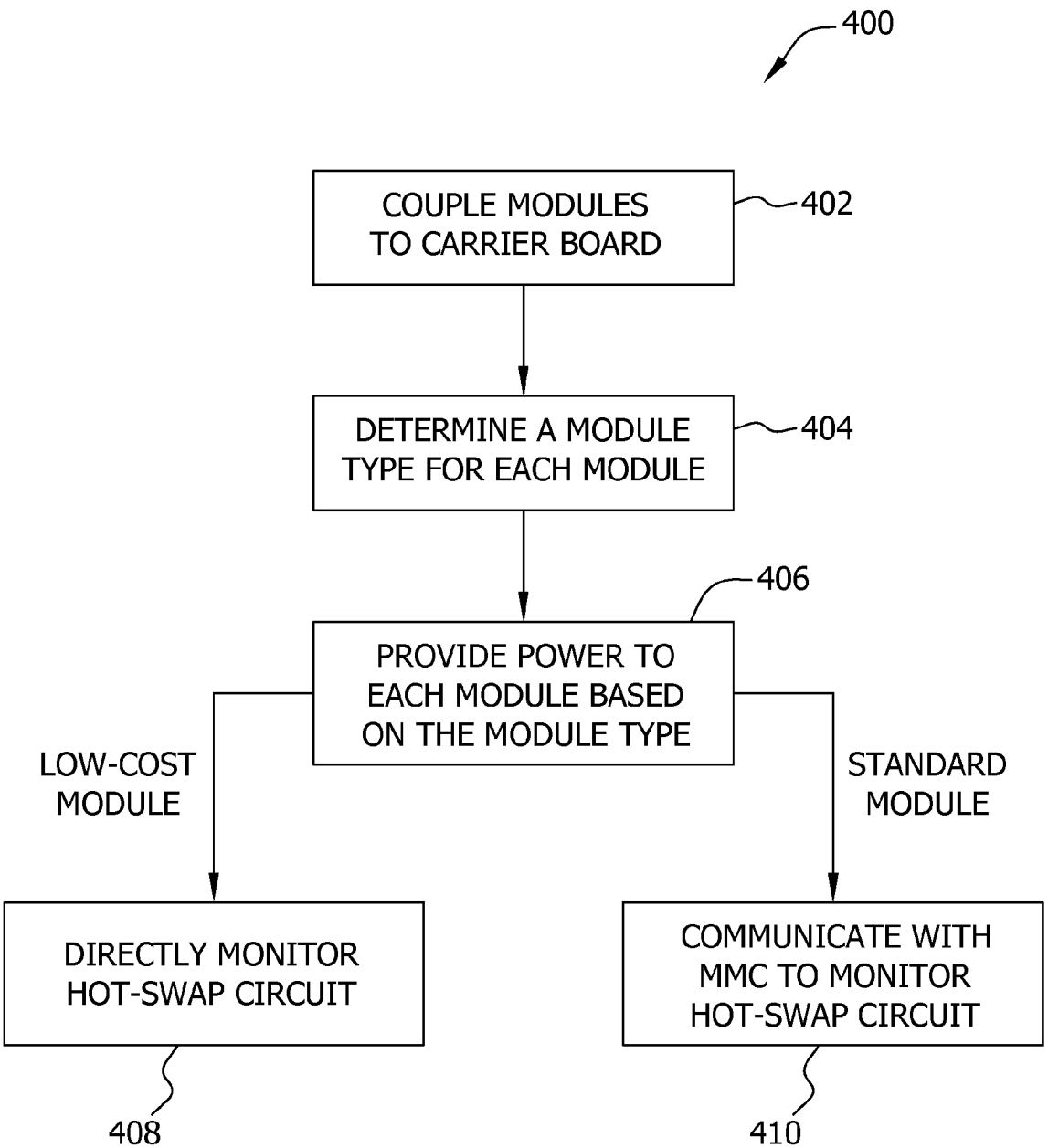
FIG. 4 is a flowchart that illustrates a method for assembling the computer shown in FIG. 1.

FIG. 4 is a flowchart 400 that illustrates a method for assembling a computer, such as computer 100 (shown in FIG. 1). In the exemplary embodiment, computer 100 includes RAM module 108, ROM module 110, processor 112, and computer bus 106 (each shown in FIG. 1). Moreover, computer 100 includes one or more carrier boards 102 (shown in FIG. 1).

In the exemplary embodiment, one or more modules 104 are coupled 402 to, such as inserted into, carrier board 102. In one embodiment, modules 104 include at least one low-cost module 114 (shown in FIGS. 1 and 3). In an alternative embodiment, modules 104 include at least one standard module 116 (shown in FIGS. 1 and 2). In another alternative embodiment, modules 104 include at least one low-cost module 114 and at least one standard module 116, as shown in FIG. 1.

Moreover, in the exemplary embodiment, BMC 136 (shown in FIG. 1) determines 404 a module type for each module 104. More specifically, IPMC 202 (shown in FIGS. 2 and 3) determines the module type based on a connection to detection pin 212 (shown in FIGS. 2 and 3) located on each module 104. For example, IPMC 202 may detect a logic low at detection pin 212 or a logic high at detection pin 212. Detection of a logic low indicates that module 104 is low-cost module 114. IPMC 202 detects a logic low at detection pin 212 on low-cost module 114 because detection pin 212 is connected to ground. Conversely, detection of a logic high indicates that module 104 is standard module 116. IPMC 202 detects a logic high at detection pin 212 on standard module 116 because detection pin 212 is left open on standard module 116, and because a trace between IPMC 202 and detection pin 212 is connected to a carrier board power supply (not shown).

In the exemplary embodiment, carrier board 102 provides 406 power to module 104 based on the module type. Specifically, power supplies 134 (shown in FIG. 1) provide power to low-cost module 116 at a first voltage level. More specifically, power supplies 134 are coupled directly to module component 118 of low-cost module 114 to provide power at the first voltage level. For standard module 116, power supplies 134 provide power to voltage converter 124 (shown in FIG. 1) at a second voltage level.

Moreover, upon determining that module 104 is low-cost module 114, carrier board 102 directly controls and monitors 408 hot-swap circuit 120 (shown in FIGS. 1 and 3). Specifically, BMC 136 is coupled directly to hot-swap circuit 120 to facilitate monitoring and controlling hot-swap switch 130 and hot-swap light device 132 (both shown in FIGS. 1 and 3). More specifically, IPMC-L isolator 206 (shown in FIGS. 2 and 3) utilizes an SCL_L pin to control and monitor hot-swap light device 132, and utilizes an SDA_L pin to control and monitor hot-swap switch 130. Upon determining that module 104 is standard module 116, BMC 136 is coupled to MMC 122 (shown in FIGS. 1 and 2). Specifically, IPMC-L isolator 206 is coupled to MMC 122 using the SCL_L and SDA_L pins to facilitate communication 410 between BMC 136 and MMC 122 using, for example, an IPMB protocol.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for assembling a computer that includes a carrier board having a board management controller (BMC), a power supply, a module component and a carrier bus, said method comprising:
    coupling a first module to the carrier board;
    coupling a second module of a different type than the first module to the carrier board, wherein the second module comprises a module management controller (MMC), and wherein said MMC is coupled to the BMC to facilitate communicating data between the module component and said carrier bus;
    determining, by the carrier board, a type of the module; and
    providing power to the module based on the module type such that a voltage component of the power is one of a first voltage and a second voltage that is different than the first voltage.

2. A method in accordance with claim 1, wherein determining a module type comprises detecting, by the BMC, that the module is a first module type.

3. A method in accordance with claim 2, wherein the module includes a hot-swap circuit, said coupling a module to the carrier board comprises coupling the hot-swap circuit to the BMC.

4. A method in accordance with claim 2, wherein determining a module type comprises detecting, by the BMC, that the module is a second module type.

5. A method according to claim 4, wherein the module includes a voltage converter, said coupling a module to the carrier board comprises coupling the voltage converter to the power supply.

6. A method in accordance with claim 2, wherein providing power to the module comprises providing power to the module at the first voltage.

7. A method in accordance with claim 4, wherein providing power to the module comprises providing power to the module at the second voltage, the second voltage greater than the first voltage.

8. A computer comprising:
    a first module comprising a module component; and
    a second module comprising a second module component, the second module being of a different type than the first module, wherein the second module comprises a module management controller (MMC);
    a carrier board comprising:
        a carrier bus;
        a board management controller (BMC) configured to detect a module type of said first and second module; and
        a power supply coupled to said BMC, said power supply configured to provide a supply voltage to said at least one module based on the module type, the supply voltage one of a first voltage and a second voltage different than the first voltage;
        wherein said MMC is coupled to said BMC to facilitate communicating data between the module component and said carrier bus.

9. A computer in accordance with claim 8, said at least one module comprising a hot-swap circuit.

10. A computer in accordance with claim 9, wherein said BMC is directly coupled to said hot-swap circuit and configured to control said hot-swap circuit.

11. A computer in accordance with claim 9, wherein said power supply is directly coupled to said module component and configured to provide the first voltage to said module component.

12. A computer in accordance with claim 8, wherein said power supply is configured to provide the second voltage to a voltage converter, the second voltage being larger than the first voltage.

13. A computer in accordance with claim 8, wherein said at least one module comprises:
    at least one first module comprising:
        said module component directly coupled to said power supply, said power supply configured to provide the first voltage to said module component; and
        a hot-swap circuit directly coupled to said BMC;
        wherein the voltage converter is coupled to said power supply, said power supply configured to provide the second voltage to said voltage converter.

14. A carrier board for use with a computer that includes a first module and a second module, the first and the second module each having a module component, said carrier board comprising:
    a controller configured to determine a module type of the first and second modules;
    a power supply configured to provide one of a first voltage and a second voltage to the first and second modules based on the module type, the first voltage being different than the second voltage; and
    a carrier bus configured to communicate with the module component of the at least one module;
    wherein the second module comprises a module management controller (MMC), said MMC is coupled to the BMC to facilitate communicating data between the module component and the carrier bus.

15. A carrier board in accordance with claim 14, wherein the first module comprises a hot-swap circuit, and said controller is directly coupled to the hot-swap circuit and is configured to control the hot-swap circuit.

16. A carrier board in accordance with claim 15, wherein said power supply is directly coupled to the module component and configured to provide the first voltage to the first module component.

17. A carrier board in accordance with claim 14, wherein the second module comprises a voltage converter, said controller coupled to the MMC to facilitate communicating data between the first or second module component and said carrier bus, said power supply configured to provide the second voltage to the voltage converter, the second voltage being larger than the first voltage.

18. A carrier board in accordance with claim 14, wherein the at least one first module comprises a hot-swap circuit, said power supply configured to provide the first voltage to the module component, said controller directly coupled to the hot-swap circuit; and wherein the at least one second module comprises a voltage converter, said power supply configured to provide the second voltage to said voltage converter.

* * * * *